(12) United States Patent
Uozumi et al.

(10) Patent No.: US 9,217,666 B2
(45) Date of Patent: Dec. 22, 2015

(54) PHOTOELECTRIC SENSOR WITH ADJUSTABLE SENSITIVITY

(71) Applicant: Keyence Corporation, Osaka (JP)

(72) Inventors: Toyoichi Uozumi, Osaka (JP); Kentaro Yamazaki, Osaka (JP)

(73) Assignee: Keyence Corporation, Osaka (JP)

( * ) Notice: Subject to any disclaimer, the term of this patent is extended or adjusted under 35 U.S.C. 154(b) by 322 days.

(21) Appl. No.: 14/043,007

(22) Filed: Oct. 1, 2013

(65) Prior Publication Data

US 2014/0145065 A1 May 29, 2014

(30) Foreign Application Priority Data

Nov. 27, 2012 (JP) ................................ 2012-259102

(51) Int. Cl.
| | |
|---|---|
| *G06M 7/00* | (2006.01) |
| *H01J 40/14* | (2006.01) |
| *G01J 1/44* | (2006.01) |
| *G01B 11/14* | (2006.01) |
| *G08B 5/00* | (2006.01) |
| *G01C 3/02* | (2006.01) |
| *G01B 11/00* | (2006.01) |
| *G01S 7/483* | (2006.01) |
| *G01S 3/00* | (2006.01) |

(Continued)

(52) U.S. Cl.
CPC . *G01J 1/44* (2013.01); *G01B 11/00* (2013.01); *G01B 11/14* (2013.01); *G01C 3/02* (2013.01); *G01J 1/0219* (2013.01); *G01J 1/16* (2013.01); *G01S 3/00* (2013.01); *G01S 7/483* (2013.01); *G01S 17/02* (2013.01); *G08B 5/00* (2013.01)

(58) Field of Classification Search
USPC .................. 340/815.4, 815.44, 815.45, 691.1, 340/691.6, 555, 556, 435, 815.53, 815.55, 340/815.56, 815.65, 815.66, 815.67, 340/426.22; 356/3–5.15, 614, 615, 622, 356/623, 388, 394; 250/203.1, 203.2, 250/203.6, 221, 214 R, 239; 235/414–417; 348/135–161; 396/121, 153
See application file for complete search history.

(56) References Cited

U.S. PATENT DOCUMENTS

| | | | | | |
|---|---|---|---|---|---|
| 4,306,147 | A | * | 12/1981 | Fukuyama et al. ... | G01S 17/026 250/221 |
| 5,095,203 | A | * | 3/1992 | Sato et al. ............. | G01S 17/026 250/214 B |

(Continued)

FOREIGN PATENT DOCUMENTS

| | | |
|---|---|---|
| JP | H09-252242 | 9/1997 |
| JP | 2006-101319 | 4/2006 |

(Continued)

*Primary Examiner* — Pascal M Bui Pho
(74) *Attorney, Agent, or Firm* — Kilyk & Bowersox, P.L.L.C.

(57) ABSTRACT

Provided is a photoelectric sensor that enables intuitive sensitivity adjustment while ensuring a wide dynamic range, and ease grasp of an adjustment state. The photoelectric sensor includes: an adjusting device having a variable resistor embedded in at least one of a driving circuit and a light receiving circuit, and configured to change a resistance value of the variable resistor according to a rotational position of a rotatable adjusting element; an evaluator configured to generate a determination signal based on a comparison result between a light receiving signal superimposed on a reference level and a threshold value; a ratio calculator configured to calculate a ratio of an amount of a light receiving signal in the light receiving signal superimposed on the reference level and a difference between the threshold value and the reference level as a margin ratio to be displayed.

8 Claims, 11 Drawing Sheets

(51) Int. Cl.
    *G01S 17/02*     (2006.01)
    *G01J 1/02*     (2006.01)
    *G01J 1/16*     (2006.01)

(56) References Cited

U.S. PATENT DOCUMENTS

| | | |
|---|---|---|
| 5,347,117 A | 9/1994 | Fooks et al. |
| 6,094,272 A | 7/2000 | Okamoto |
| 6,124,936 A | 9/2000 | Okamoto |
| 6,211,784 B1 * | 4/2001 | Nishide .............. G01S 7/51 340/436 |
| 6,555,806 B2 | 4/2003 | Okamoto |
| 6,642,510 B1 | 11/2003 | Sugiyama et al. |
| 6,646,251 B1 | 11/2003 | Okamoto |
| 6,710,326 B2 | 3/2004 | Okamoto |
| 6,717,523 B2 | 4/2004 | Sugiyama |
| 6,774,357 B2 | 8/2004 | Sugiyama et al. |
| 6,803,556 B2 | 10/2004 | Sugiyama |
| 6,838,656 B2 | 1/2005 | Okamoto |
| 6,894,662 B2 | 5/2005 | Fukumura |
| 7,022,979 B2 | 4/2006 | Sugiyama et al. |
| 7,053,786 B2 | 5/2006 | Sugiyama |
| 7,176,451 B2 | 2/2007 | Sugiyama et al. |
| 7,312,854 B2 | 12/2007 | Sugiyama et al. |

FOREIGN PATENT DOCUMENTS

| | | |
|---|---|---|
| JP | 2006-292702 | 10/2006 |
| JP | 2006-310080 | 11/2006 |

* cited by examiner

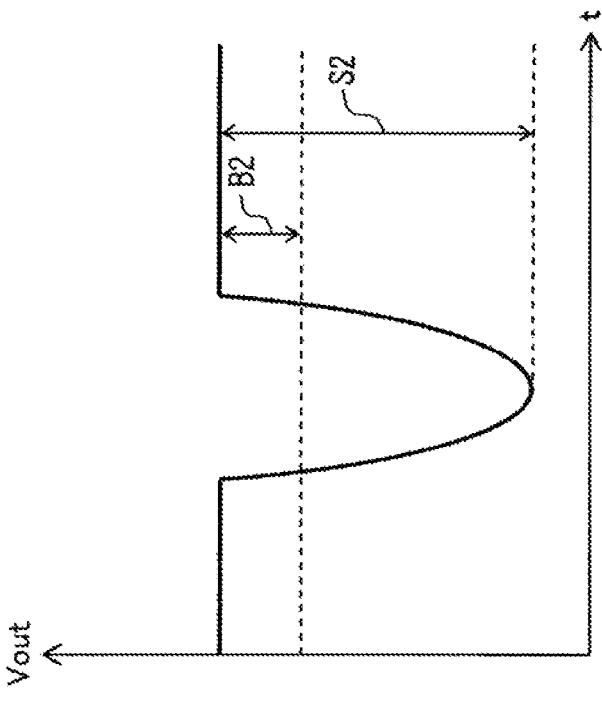
FIG. 7A   WHEN RESISTANCE VALUE R3 IS SMALL
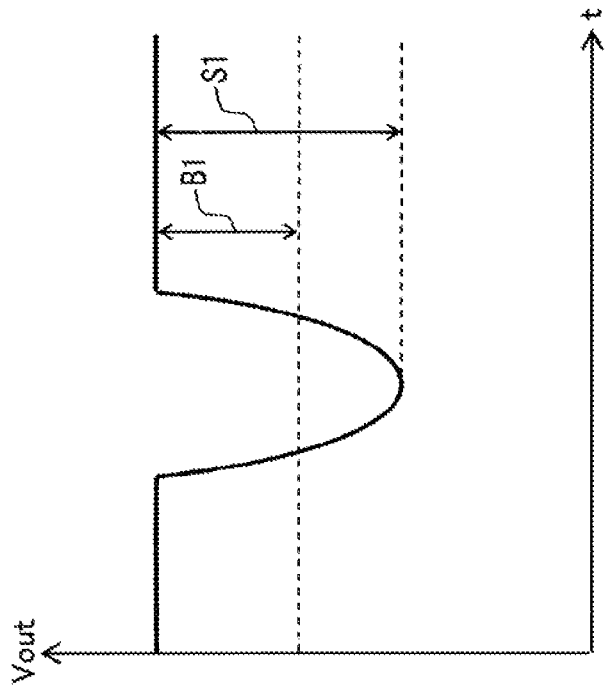
FIG. 7B   WHEN RESISTANCE VALUE R3 IS LARGE

LIGHT RECEIVING CIRCUIT 5

PHOTOELECTRIC SENSOR WITH ADJUSTABLE SENSITIVITY

CROSS-REFERENCE TO RELATED APPLICATIONS

The present application claims foreign priority based on Japanese Patent Application No. 2012-259102, filed Nov. 27, 2012, the contents of which is incorporated herein by reference.

BACKGROUND OF THE INVENTION

1. Field of the Invention

The present invention relates to photoelectric sensors, and more particularly, the present invention relates to improvements in photoelectric sensors that receive detection light and generate determination signals.

2. Description of Related Art

A photoelectric sensor generally includes a light projecting section that generates detection light, a light receiving section that receives the detection light, and a control section that controls a timing of the light projection and reception and generates a determination signal indicating the presence or absence of a detection target object based on a light reception amount. The photoelectric sensors are grouped into two types: an integral type in which a light projecting section and a light receiving section are arranged in one housing, and a separate type in which the light projecting section and the light receiving section are respectively arranged in separate housings. The photoelectric sensors are further divided into two types: a transmission type in which the detection light is blocked by the detection target object, and a reflective type in which the detection light reflected by the detection target object is received.

A determination signal is generated based on a comparison result obtained by comparing the light reception amount when detection light is projected with a predetermined determination threshold value. For example, in the transmission type photoelectric sensor, it is determined that a detection target object is present when the light reception amount is smaller than the determination threshold value. On the other hand, in the reflective type photoelectric sensor, it is determined that a detection target object is present when the light reception amount is larger than the determination threshold value.

Examples of conventional photoelectric sensors include a photoelectric sensor that is capable of adjusting the sensitivity by displaying a light reception amount and a determination threshold value and changing the determination threshold value (see, for example, JP H9-252242 A). Also, there is a photoelectric sensor that determines and displays a margin ratio indicative of how much margin a light reception amount has with respect to a determination threshold value (see, for example, JP 2006-292702 A). JP 2006-292702 A discloses changing a determination threshold value by adjusting a rotary operator.

However, the photoelectric sensors of the above types have such a disadvantage that the determination threshold value is not appropriately fixed and determination accuracy is reduced, when the photoelectric sensors are used in a situation where, in the presence or absence of a detection target object, an amplifier circuit is saturated which amplifies a light receiving signal indicating a light reception intensity.

For example, in a reflective type photoelectric sensor, a light reception amount is saturated in some cases when a distance to a detection target object is smaller than a specified value. Moreover, signal noise or ambient light is likely to affect the determination and the determination accuracy may be reduced when a difference in the light reception amount between the presence and absence of a detection target object is small.

On the other hand, there is known a photoelectric sensor in which adjusting light reception sensitivity of a light receiving section or a light emission amount of a light projecting section makes it possible to prevent an amplifier circuit for a light receiving signal from being saturated and to suppress reduction in determination accuracy. The light reception sensitivity is adjusted by changing an amplification factor of the amplifier circuit. For example, the amplification factor is adjusted by changing a resistance value of a trimming resistor. The trimming resistor is a variable resistor having a resistance value that changes according to a rotational position of an operator operated by a user.

Most of conventional photoelectric sensors, which adjust the light reception sensitivity using a trimming resistor, generate a determination signal using an analog circuit. The analog circuit compares a determination light receiving signal in which a light receiving signal is superimposed on a reference level with a level signal indicating a threshold level. Further, the photoelectric sensors of this type adjust, in many cases, the sensitivity by changing the reference level of the determination light receiving signal in order to ensure a wide dynamic range. Hence, displaying the signal level of the determination light receiving signal or the threshold level does not make it easy to grasp an adjustment state as to whether or not the sensitivity is appropriately adjusted.

In addition, a photoelectric sensor that changes a threshold level to adjust light reception sensitivity has a smaller dynamic range than a photoelectric sensor that changes a reference level to adjust light reception sensitivity. Thus, in this type of photoelectric sensor, the dynamic range is thus increased in such a manner that plural detection modes with different detection ranges are made switchable or the photoelectric sensor is equipped with a function of adjusting a light reception parameter other than a threshold level, such as an amplification factor of a light receiving circuit. However, this does not enable an intuitive adjustment because adjusting a threshold level and adjusting a light reception parameter for offsetting the dynamic range are separate processing.

SUMMARY OF THE INVENTION

The present invention has been made in view of the above circumstances, and an object thereof is to provide a photoelectric sensor that is capable of intuitive adjustment of the sensitivity while ensuring a wide dynamic range and permits easy grasp of an adjustment state. In particular, the object of the present invention is to provide a photoelectric sensor capable of intuitive adjustment of the sensitivity by rotating an operator of a variable resistor.

A photoelectric sensor according to one embodiment of the present invention includes: a light projecting unit having a light projecting element and a driving circuit, the light projecting unit generating pulse-like detection light through driving of the light projecting element by the driving circuit; a light receiving element that receives the detection light and generates a light receiving signal according to the amount of the light received; a light receiving circuit that amplifies the light receiving signal and generates a determination light receiving signal in which the light receiving signal is superimposed on a reference level; a signal strength adjusting unit having a variable resistor, the variable resistor being connected to an operator and at least one of the driving circuit and the light receiving circuit and changing a light receiving signal component of the determination light receiving signal based on a resistance value of the variable resistor that changes according to a rotational position of the operator; a determination unit that generates a determination signal based on a comparison result between the determination light receiving signal and a determination threshold value; a margin ratio calculating unit that obtains a margin ratio, which is a ratio of the light receiving signal component of the determination light receiving signal and a difference between the determination threshold value and the reference level; and a margin ratio display unit that displays the margin ratio.

With this configuration, the light receiving signal component of the determination light receiving signal is changed according to the rotational position of the operator of the variable resistor when the operator is rotated. Thus, it is possible to adjust a margin ratio indicating how much margin the determination light receiving signal has with respect to the determination threshold value. Further, by displaying the margin ratio using the margin ratio display unit, it is possible to easily grasp whether or not the photoelectric sensor is in an operating state where the sensor can correctly determine the presence or absence of a detection target object, and to adjust the margin ratio according to the operating state. In particular, rotating the operator of the variable resistor allows intuitive sensitivity adjustment and ease grasp of the adjustment state. Moreover, a wide dynamic range can be ensured because the light receiving signal component of the determination light receiving signal is changed.

A photoelectric sensor according to another embodiment of the present invention additionally has a configuration in which the signal strength adjusting unit is configured such that a characteristic line indicating a correspondence relation of the margin ratio to the rotational position is convex downward. With this configuration, it is possible to facilitate adjustment of the margin ratio by changing the margin ratio such that the characteristic line indicating the correspondence relation of the margin ratio to the rotational position of the operator becomes convex downward. For example, when the value of the margin ratio is large, the margin ratio can be significantly changed by rotating the operator of the variable resistor by a small angle, so that the margin ratio can be easily adjusted. On the other hand, when the value of the margin ratio is small, the margin ratio can be fine-adjusted by rotating the knob by a sufficient angle, so that the margin ratio can be accurately adjusted.

A photoelectric sensor according to still another embodiment of the present invention additionally has a configuration in which the signal strength adjusting unit changes a difference between the determination threshold value and the reference level by changing, according to the rotational position, at least one of the determination threshold value and the reference level in addition to the light receiving signal component of the determination light receiving signal. With this configuration, by changing a light receiving parameter such as a threshold level and a reference level, it is possible to make the characteristic line convex downward which indicates the correspondence relation of the margin ratio to the rotational position of the operator.

A photoelectric sensor according to yet another embodiment of the present invention additionally includes a reference light reception amount storage unit that holds, as the reference level, the determination light receiving signal when the detection light is not projected. With this configuration, it is possible to obtain the light receiving signal component from the determination light receiving signal when the detection light is projected and the reference level when the detection light is not projected.

A photoelectric sensor according to yet another embodiment of the present invention additionally has a configuration in which the signal strength adjusting unit includes a light reception amount offset unit that offsets the determination light receiving signal based on a resistance value of the variable resistor.

With this configuration, offsetting the determination light receiving signal makes it possible to change not only the light receiving signal component of the determination light receiving signal when the detection light is projected but also the reference level of the determination light receiving signal when the detection light is not projected. Thus, with a simple configuration, the characteristic line can be made convex downward which indicates the correspondence relation of the margin ratio to the rotational position of the operator.

A photoelectric sensor according to yet another embodiment of the present invention additionally has a configuration in which the light receiving circuit includes an inverting amplifier circuit using an operational amplifier, and the light reception amount offset unit includes a power supply circuit that supplies a constant current to an inverting input terminal of the operational amplifier.

With this configuration, a constant current supplied to the inverting input terminal of the operational amplifier flows from a virtually-grounded inverting input terminal to an output terminal via a feedback path. Thus, it is possible to offset the determination light receiving signal amplified by the operational amplifier.

A photoelectric sensor according to yet another embodiment of the present invention additionally has a configuration in which the signal strength adjusting unit includes a light emission amount adjusting unit that makes the characteristic line convex downward which indicates the correspondence relation of the margin ratio to the rotational position, by changing a light emission amount of the light projecting element based on a resistance value of the variable resistor. With this configuration, by changing the light emission amount of the light projecting element, it is possible to make the characteristics line convex downward which indicates the correspondence relation of the margin ratio to the rotational position of the operator.

A photoelectric sensor according to yet another embodiment of the present invention additionally includes: a housing containing the light projecting unit, the light receiving element, the light receiving circuit, and the signal strength adjusting unit, the housing being provided with a light projection/reception window for projecting and receiving the detection light, the operator, and the margin ratio display unit.

With this configuration, it is possible to achieve an integral type photoelectric sensor in which a margin ratio can be easily adjusted by displaying the margin ratio and rotating the operator of the variable resistor.

The present invention provides a photoelectric sensor that is capable of intuitive sensitivity adjustment while ensuring a wide dynamic range and that allows easy grasp of an adjustment state. In particular, the present invention provides a photoelectric sensor capable of intuitive sensitivity adjustment by rotating an operator of a variable resistor.

BRIEF DESCRIPTION OF THE DRAWINGS

FIGS. 7A and 7B each show an example of the operations of the photoelectric sensor 1 in FIG. 2, the views showing voltage waveforms of the determination light receiving signal in a case where a resistance value R3 of a trimming resistor 51 is varied;

DETAILED DESCRIPTION OF PREFERRED EMBODIMENTS

First Embodiment
<Photoelectric Sensor>

Figure 1:
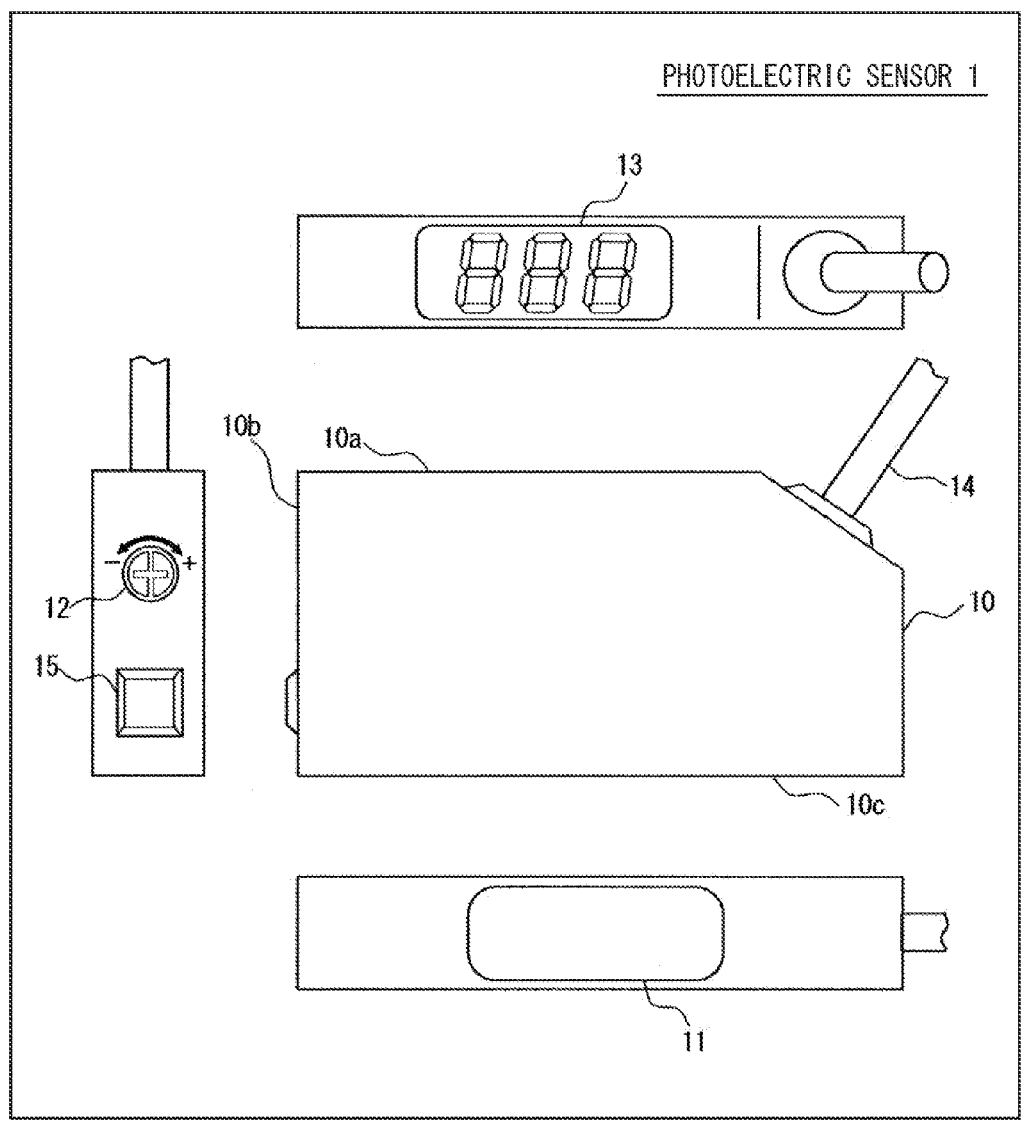
FIG. 1 is an external appearance view showing an example of a configuration of a photoelectric sensor 1 according to a first embodiment of the present invention, the view showing an integral reflective type photoelectric sensor.

FIG. 1 is an external appearance view showing an example of a configuration of a photoelectric sensor according to a first embodiment of the present invention, the view showing an integral reflective type photoelectric sensor 1. FIG. 1 mainly shows the photoelectric sensor 1 viewed from a side, and further shows a housing 10 having an upper panel 10a, a front panel 10b, and a bottom panel 10c. The photoelectric sensor 1 is a detection switch that generates a determination signal indicating the presence or absence of a detection target object by irradiating the detection target object with detection light L1 and receiving reflected light L2 from the detection target object. Visible rays or infrared rays are used for the detection light L1.

The photoelectric sensor 1 is capable of adjusting light reception sensitivity, and includes a housing 10 and a transmission cable 14 connected to the housing 10. In the housing 10, the upper panel 10a is provided with a display section 13, the front panel 10b is provided with a trimming operation section 12 and an LED display lamp 15, and a bottom panel 10c is provided with a light projection/reception window 11.

The light projection/reception window 11 is an optical opening through which the detection light L1 exits and the reflected light L2 enters. The trimming operation section 12 includes an operator operated by a user, and constitutes a trimming resistor having a resistance value that changes according to a rotational position of the operator. The housing 10 contains a light projecting section for the detection light L1, a light receiving element for the reflected light L2, a light receiving circuit, the trimming resistor, and the like.

In the photoelectric sensor 1, the trimming operation section 12 is a sensitivity adjusting operation section for adjusting light reception sensitivity. The trimming operation section 12 can be rotated by a predetermined angle with a tool such as a screwdriver. For example, the light reception sensitivity is increased when the trimming operation section 12 is rotated to the right, while the light reception sensitivity is reduced when the trimming operation section 12 is rotated to the left.

The display section 13 is a display device that numerically displays a light reception amount and a margin ratio. For example, the display section 13 is configured by a 3-digit 7-segment LED (light emitting diode). The photoelectric sensor 1 may include, as the display section 13, a liquid crystal display or an organic EL (electroluminescence) display capable of displaying three-digit numbers.

The transmission cable 14 includes a power supply line for supplying power supply from external equipment and a signal line for outputting the determination signal to the external equipment, and is mounted at a connection part provided to the back of the housing 10. The LED display lamp 15 is a display device for displaying an output state of the determination signal.

In the photoelectric sensor 1, it is possible to prevent an amplifier circuit for a light receiving signal from becoming saturated and suppress reduction in determination accuracy, by adjusting the light reception sensitivity. For example, if a distance to a detection target object is smaller than a defined value and there is a possibility that the light reception amount becomes saturated, it is possible to prevent occurrence of the saturation by reducing the light reception sensitivity. Further, when a difference in the light reception amount between the presence and absence of a detection target object is small, it is possible to reduce influences of signal noise or ambient light by increasing the light reception sensitivity.

Figure 2:
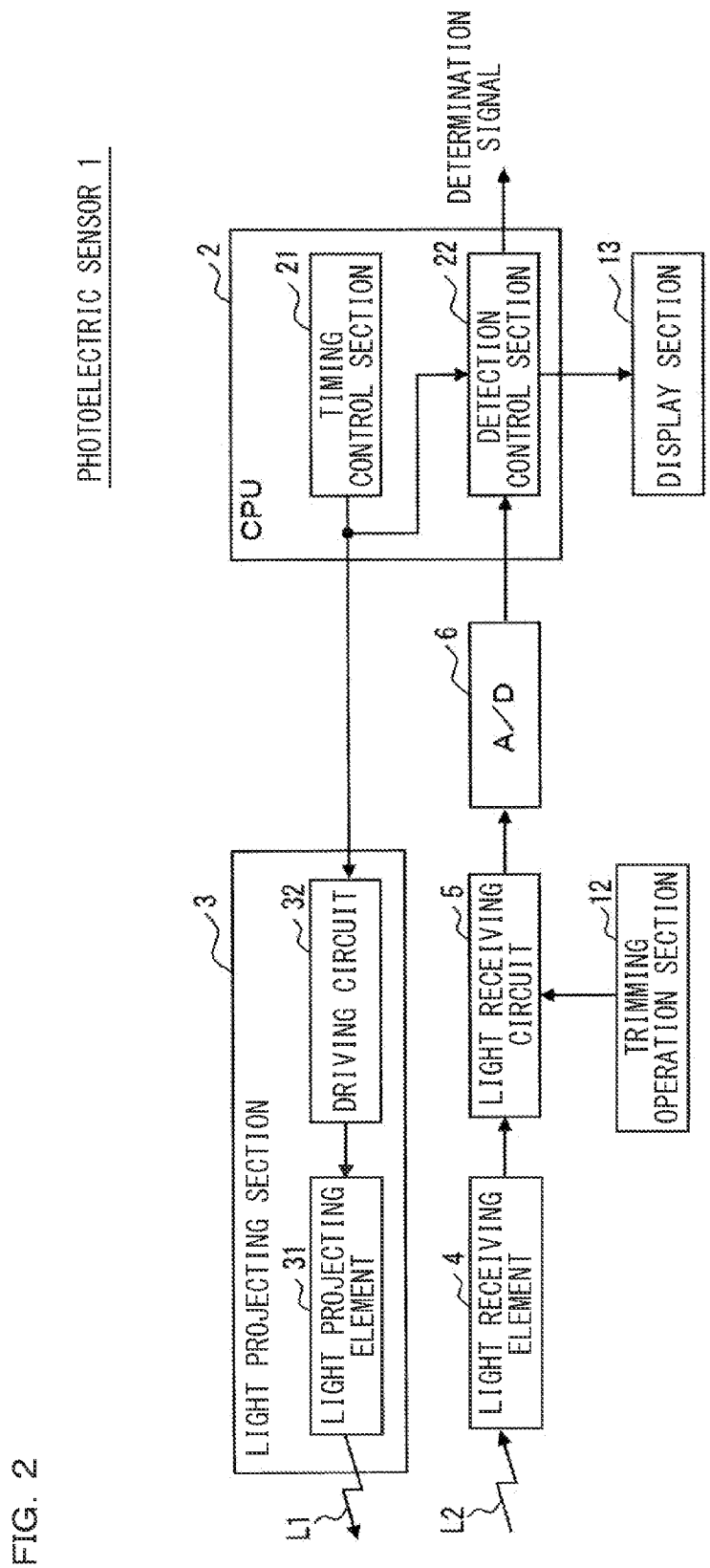
FIG. 2 is a block diagram showing the configuration example of the photoelectric sensor 1 in FIG. 1.

FIG. 2 is a block diagram showing the configuration example of the photoelectric sensor 1 in FIG. 1. The photoelectric sensor 1 includes a CPU 2, a light projecting section 3, a light receiving element 4, a light receiving circuit 5, an analog-to-digital conversion section 6, the trimming operation section 12, and the display section 13. The light projecting section 3 includes a light projecting element 31 that generates the detection light L1 and a driving circuit 32 for turning on the light projecting element 31 at a predetermined emission intensity. For example, a light emitting element such as an LED is used for the light projecting element 31.

The light receiving element 4 receives the reflected light L2, generates a light receiving signal according to the amount of the light received, and outputs the light receiving signal to the light receiving circuit 5. For example, the light receiving element 4 is formed of a PD (photo diode) and generates a light receiving signal having a current that changes according to a light reception intensity.

The light receiving circuit 5 amplifies the light receiving signal at a predetermined amplification factor, generates a determination light receiving signal in which the light receiving signal is superimposed on a predetermined reference level, and outputs the determination light receiving signal to the analog-to-digital conversion section 6. The amplification factor of the light receiving circuit 5 can be adjusted by operating the trimming operation section 12 to change the resistance value of the trimming resistor. The light reception sensitivity is adjusted by changing the amplification factor of the light receiving circuit 5 as described above.

The analog-to-digital conversion section 6 is a converter circuit that converts the determination light receiving signal into a digital signal and outputs the digital signal to the CPU 2. The CPU 2 includes a timing control section 21 and a detection control section 22, and serves as a control section that controls the light projecting section 3 and the display section 13 and generates a determination signal based on the determination light receiving signal.

The timing control section 21 controls a timing of projecting the detection light L1 and a timing of receiving the reflected light L2. The detection control section 22 generates a determination signal based on a voltage level of the determination light receiving signal when the detection light L1 is being projected. The detection control section 22 further obtains a margin ratio based on respective voltage levels of the determination light receiving signal when the detection light L1 is being projected and is not being projected, and generates display data for displaying the obtained margin ratio in the display section 13.

<Detection Control Section 22>

Figure 3:
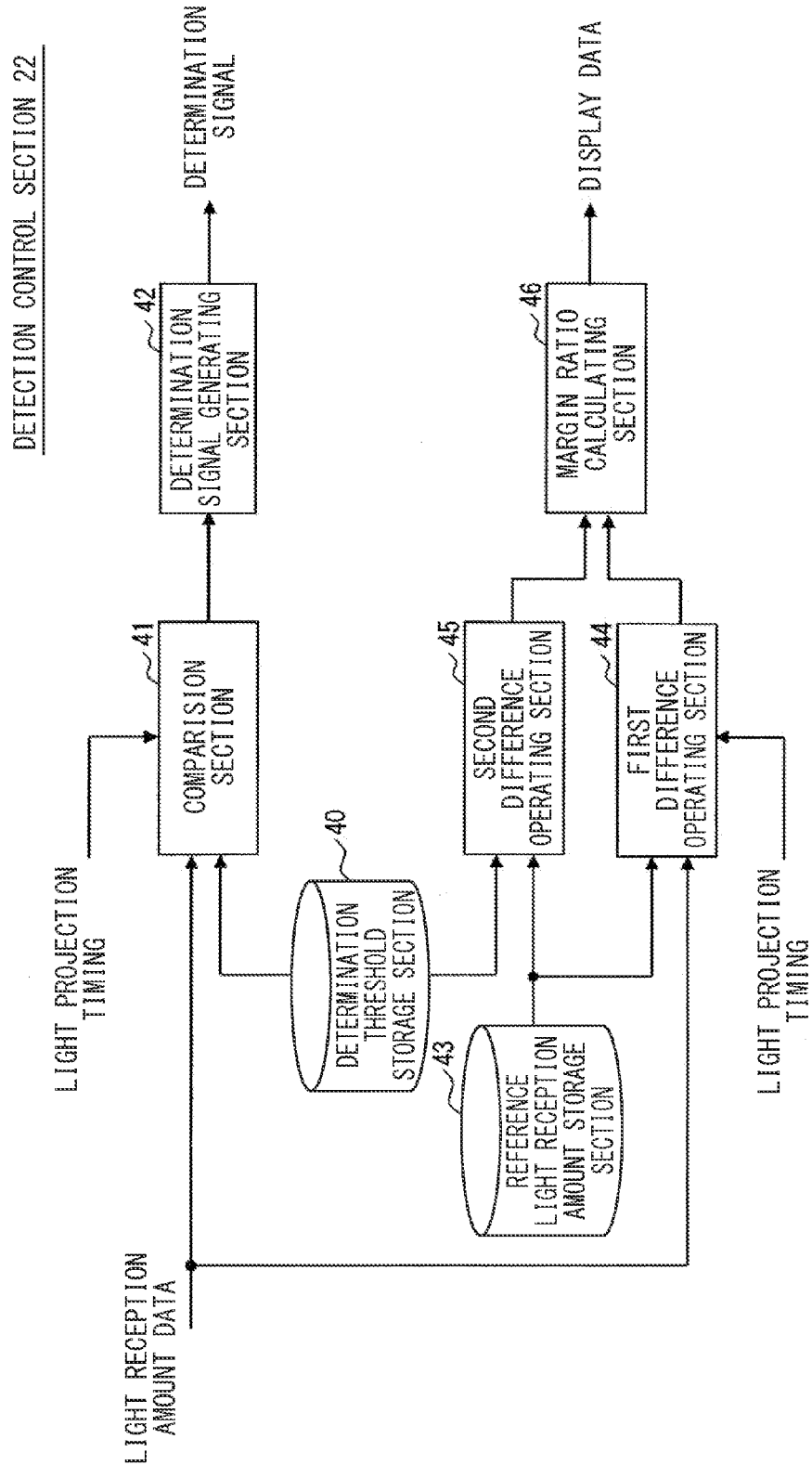
FIG. 3 is a block diagram showing an example of a configuration of a detection control section 22 in FIG. 2.

FIG. 3 is a block diagram showing an example of a configuration of the detection control section 22 in FIG. 2. The detection control section 22 includes a determination threshold storage section 40, a comparison section 41, a determination signal generating section 42, a reference light reception amount storage section 43, a first difference operating section 44, a second difference operating section 45, and a margin ratio calculating section 46. The determination threshold storage section 40 holds a determination threshold value for determining the presence or absence of a detection target object. For example, a threshold voltage Vt having a predetermined voltage level is held as the determination threshold value.

The comparison section 41 compares light reception amount data obtained when the detection light L1 is being projected with the determination threshold value, and outputs the comparison result to the determination signal generating section 42. Specifically, if the voltage level of the determination light receiving signal at projection of the detection light L1 is expressed as a detection voltage Vs, the detection voltage Vs is compared with the threshold voltage Vt. The determination signal generating section 42 generates a determination signal based on the comparison result of the comparison section 41. For example, depending on whether the detection voltage Vs is lower or higher than the threshold voltage Vt, a signal having a different voltage level is generated as the determination signal.

The reference light reception amount storage section 43 holds, as the reference level, light reception amount data obtained when the detection light L1 is not being projected. For example, if the voltage level of the determination light receiving signal when the detection light L1 is not being projected is expressed as a reference voltage Vb, this reference voltage Vb is held as the reference level. The first difference operating section 44 obtains a first difference S between the reference level and the light reception amount data obtained at projection of the detection light L1. Specifically, the voltage level of the determination light receiving signal at projection of the detection light L1, that is, a voltage difference between the detection voltage Vs and the reference voltage Vb is obtained as the first difference S. The first difference S is a light receiving signal component of the determination light receiving signal.

The second difference operating section 45 obtains a second difference B between the determination threshold value and the reference light reception amount. Specifically, a voltage difference between the threshold voltage Vt and the reference voltage Vb is obtained as the second difference B. The margin ratio calculating section 46 obtains a margin ratio M, which is a ratio between the first difference S and the second difference B, and generates display data to be numerically displayed in the display section 13.

The margin ratio M is a physical quantity indicating how much margin a light reception amount has with respect to a determination threshold value, and is used for objectively evaluating the stability of determination output. The margin ratio M is obtained from the expression: $M=(S/B)\times 100(\%)$ <Light Receiving Circuit 5>

Figure 4:
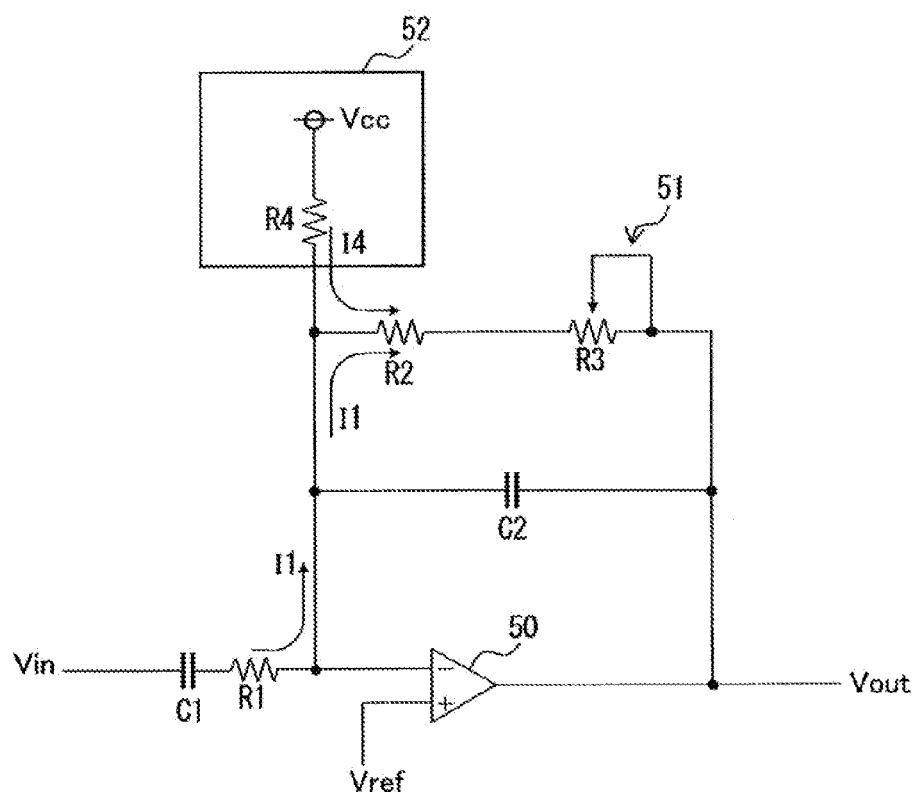
FIG. 4 shows an example of a configuration of a light receiving circuit 5 in FIG. 2.

FIG. 4 shows an example of a configuration of the light receiving circuit 5 in FIG. 2. The light receiving circuit 5 includes an operational amplifier 50, a trimming resistor 51, and a light reception amount offset section 52. In the light receiving circuit 5, it is possible to adjust the amplification factor and offset the determination light receiving signal by a predetermined amount by operating the trimming operation section 12 to change a resistance value R3 of the trimming resistor 51. The trimming resistor 51 and the light reception amount offset section 52 are signal strength adjusting units.

The operational amplifier 50 is an operational amplifier that differential-amplifies an input voltage Vin and outputs the input voltage Vin as an output voltage Vout. The light receiving circuit 5 is an inverting amplifier circuit provided with the operational amplifier 50. In the light receiving circuit 5, the light receiving signal is input to an inverting input terminal of the operational amplifier 50 as the input voltage Vin via a capacitor C1 and a resistor element r1 (resistance value R1), and a predetermined reference voltage Vref is applied to a non-inverting input terminal of the operational amplifier 50. The determination light receiving signal is output from an output terminal of the operational amplifier 50 as an output voltage Vout. The capacitor C1 is a capacitative element for blocking a bias component of the light receiving signal.

For convenience of description, each of the input voltage Vin and the output voltage Vout is often separated into a direct-current component and a signal component. If the input voltage Vin is divided into a direct-current component Vinb and a signal component Vins for description, the capacitor C1 blocks the direct-current component Vinb, and a signal for the signal component Vins is output as the output voltage Vout. With reference to the light receiving circuit 5 in FIG. 12, to be described later, since the reference voltage Vref is applied to the non-inverting input terminal of the operational amplifier 50, the voltage of the inverting input terminal becomes equal to the reference voltage Vref by virtual-grounding.

Since the capacitor C1 blocks the direct-current component and the inverting input terminal of the operational amplifier 50 has extremely high input impedance, a current of the direct-current component is not allowed to flow through the resistor elements r1 and r2 (resistance value R2). Hence, the voltage Vref of the inverting input terminal and the direct-current component Voutb of the output voltage Vout are accordingly equal to each other. On the other hand, the capacitor C1 regards the signal component Vins of the input voltage Vin as short-circuit, the signal component Vins is amplified $-(R2/R1)$ times. That is, with the light receiving circuit 5 shown in FIG. 12, the input voltage Vin (the sum of the direct-current component Vinb and the signal component Vins) is converted into the output voltage Vout, which is Vref−(R2/R1)×Vins.

Referring back to the light receiving circuit 5 in FIG. 4, a feedback path that returns a part of the output from the operational amplifier 50 to the inverting input terminal includes the resistor element r2 and the trimming resistor 51. The resistor element r2 is for adjusting the lower limit of the amplification factor.

The trimming resistor 51 is a variable resistor having a resistance value R3 that changes according to the rotational position of an operator operated by a user. Specifically, the trimming resistor 51 includes a fixed resistor having an exposed resistor member, and a slider (movable terminal) placed between terminals of the fixed resistor and connected to the operator of the trimming operation section 12. The slider moves on the fixed resistor in conjunction with rotation of the operator.

The resistance value R3 linearly changes with respect to the rotation angle of the operator. The resistor element r2 and the trimming resistor 51 are connected in series. Further, the feedback path is connected in parallel to the capacitor C2 for stabilizing the output.

By offsetting the determination light receiving signal based on the resistance value R3 of the trimming resistor 51, the light reception amount offset section 52 changes the margin ratio M so that the characteristic line of the margin ratio M to the resistance value R3 becomes convex downward. The light reception amount offset section 52 includes a direct-current power supply Vcc and a resistor element R4, and serves as a power supply circuit that supplies a constant current I4= (Vcc−Vref)/R4 since the virtually-grounded inverting input terminal of the operational amplifier 50 has a voltage equal to the reference voltage Vref.

The constant current I4 supplied from the light reception amount offset section 52 can only flow through a path going through the resistor element r2 and the trimming resistor 51 because the direct-current component is blocked by the capacitor C1 and the inverting input terminal of the operational amplifier 50 has significantly high input impedance. For this reason, the direct-current component Voutb of the output voltage Vout is expressed as Vref−(R2+R3)×I4, which is shifted by −(R2+R3)×I4 compared with a case where the light receiving circuit 5 does not include the light reception amount offset section 52.

On the other hand, since the capacitor C1 can regard the signal component Vins of the input voltage Vin as short-circuit, the signal component Vins of the input voltage Vin is amplified −(R2+R3)/R1 times. That is, with the light receiving circuit 5 shown in FIG. 4, the input voltage Vin (the sum of the direct-current component Vinb and the signal component Vins) is converted into a voltage in which the signal component {−(R2+R3)/R1}×Vins is superimposed on the direct-current component (Vref−(R2+R3)×I4). Therefore, the output voltage Vout is expressed as Vref−(R2+R3)×I4− {(R2+R3)/R1}×Vins.

If the signal component Vins of the input voltage Vin is R1×I1, the output voltage Vout can be also expressed as Vref−R2×(I1+I4)−R3×(I1+I4).

The characteristics of the signal component Vouts of the output voltage Vout to the signal component Vins of the input voltage Vin is represented by a downward-sloping line having a slope that changes according to the resistance value R3. On the other hand, the characteristics of the direct-current component Voutb of the output voltage Vout to the resistance value R3 is represented by a downward-sloping line having a slope that changes according to the value of I4 regardless of the direct-current component Vinb of the input voltage Vin. Due to such characteristics of the output voltage Vout, the magnitude of the voltage difference B=(Vt−Vref) linearly reduces to the resistance value R3, and the characteristic line of the margin ratio M to the resistance value R3 can be made convex downward.

<Projection Pulse and Determination Light Receiving Signal>

Figure 5:
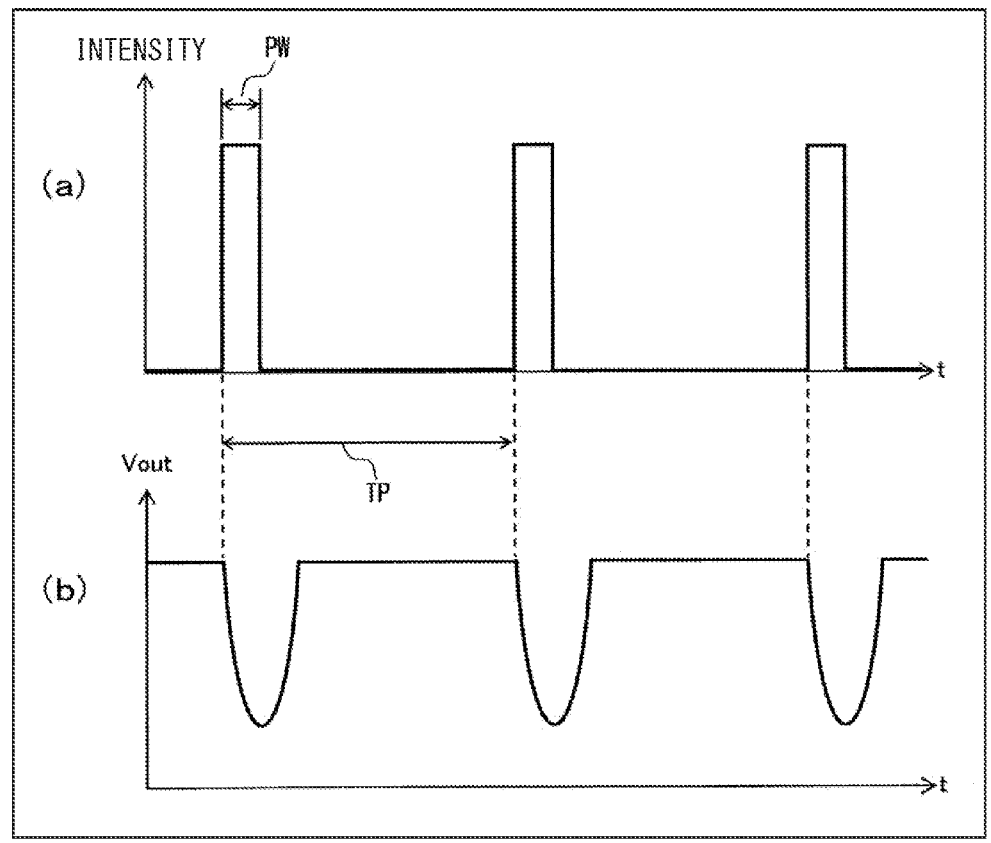
FIGS. 5A and 5B each show an example of operations of the photoelectric sensor 1 in FIG. 2, the views showing a light strength waveform of a light projection pulse and a voltage waveform of a determination light receiving signal.

FIGS. 5A and 5B each show an example of operations of the photoelectric sensor 1 in FIG. 2. FIG. 5A shows an intensity waveform of a projection pulse and FIG. 5B shows a voltage waveform of the determination light receiving signal having been amplified by the light receiving circuit 5. The detection light L1 is projected in a pulse pattern at a certain time period, i.e., a projection cycle TP. The projection cycle TP is sufficiently longer than a pulse width PW of the projection pulse. For example, the projection cycle TP is 25 µs to 500 µs while the pulse width PW is 1 µs to 5 µs.

A reception timing of the reflected light L2 is determined based on the projection cycle TP and the pulse width PW of the detection light L1. The voltage level (output voltage Vout) of the determination light receiving signal is extremely small in synchronization with the projection timing.

Figure 6:
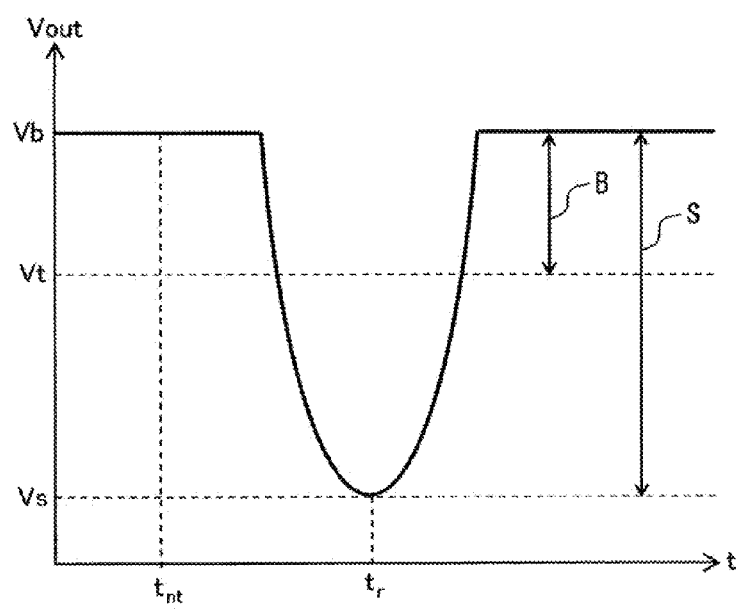
FIG. 6 shows an example of the operations of the photoelectric sensor 1 shown in FIG. 2, the view showing the voltage waveform of the determination light receiving signal, a reference voltage Vref, a detection voltage Vs, and a threshold voltage Vt.

FIG. 6 shows an example of the operations of the photoelectric sensor 1 in FIG. 2. FIG. 6 shows a voltage waveform of the determination light receiving signal having been amplified by the light receiving circuit 5, a reference voltage Vb, a detection voltage Vs, and a threshold voltage Vt. In the voltage waveform of the determination light receiving signal, the voltage level is substantially constant when the detection light L1 is not being projected, the voltage level rapidly reduces to be extremely small in synchronization with the projection timing, and then increases to the voltage level when the detection light L1 is not being projected. The reference voltage Vb has a voltage level of the determination light receiving signal obtained when the detection light L1 is not being projected (time $t_{nt}$).

On the other hand, the detection voltage Vs has a voltage level of the determination light receiving signal obtained when the detection light L1 is being projected. For example, the detection voltage Vs has a voltage level of the determination light receiving signal obtained at a predetermined light reception timing (time $t_r$) of the projection. The voltage difference B is expressed as Vt−Vref and the voltage difference S is expressed as Vs−Vref. The margin ratio M is obtained from the expression M=(S/B)×100.

FIGS. 7A and 7B each show an example of the operations of the photoelectric sensor 1 in FIG. 2. FIGS. 7A and 7B show voltage waveforms of the determination light receiving signal in a case where the resistance value R3 of the trimming resistor 51 is varied. FIG. 7A shows a case where the resistance value R3 is small and FIG. 7B shows a case where the resistance value R3 is large.

When the resistance value R3 is large, the voltage levels of the reference voltage Vb and the detection voltage Vs are reduced more than when the resistance value R3 is small. Thus, the voltage difference B2 is smaller than the voltage difference B1. On the other hand, the voltage difference S2 is larger than the voltage difference S1. Hence, the characteristic line of the margin ratio M to the resistance value R3 is accordingly convex downward, that is, the margin ratio M monotonically increases as the resistance value R3 increases.

Figure 8A:
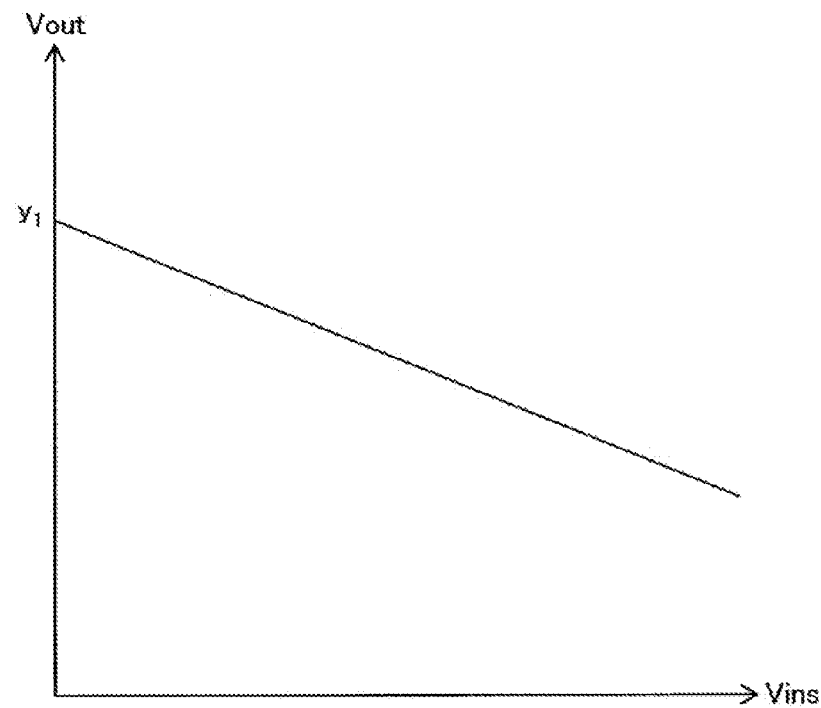
FIGS. 8A and 8B are each an explanatory view schematically showing an example of operations of the light receiving circuit 5 in FIG. 4, the views showing the characteristics of an output voltage Vout to a signal component Vins of an input voltage Vin and the resistance value R3.
Figure 8B:
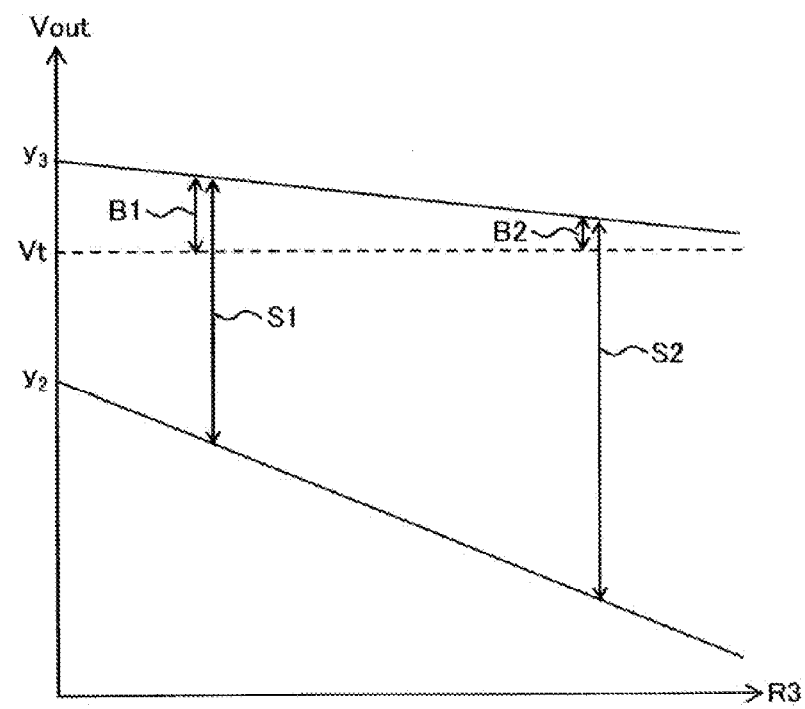

FIGS. 8A and 8B are each an explanatory view schematically showing an example of operations of the light receiving circuit 5 in FIG. 4. FIG. 8A shows the characteristics of the output voltage Vout to the signal component Vins of the input voltage Vin and FIG. 8B shows the characteristics of the output voltage Vout to the resistance value R3. In FIGS. 8A and 8B, the vertical axes represent the output voltage Vout.

As shown in FIG. 8A, the characteristics of the output voltage Vout (a voltage in which the signal component is superimposed on the direct-current component) to the signal component Vins is represented by a downward-sloping line because the amplification factor is constant when the resistance value R3 is constant. In this characteristic line, the y-intercept $y_1$ is Vref−(R2+R3)×I4 and the slope $k_1$, which corresponds to the amplification factor, is −(R2+R3)/R1.

As shown in FIG. 8B, the characteristics of the output voltage Vout (the voltage in which the signal component is superimposed on the direct-current component) to the resistance value R3 is represented by a downward-sloping line. In this characteristic line, the y-intercept $y_2$ is Vref−R2×I4−(R2/R1)×Vins=Vref−R2×I4−R2×I1 and the slope $k_2$ is −(I1+I4). The y-intercept $y_2$ and the slope $k_2$ increase when the input current I1 decreases.

In particular, the direct-current component Voutb of the output voltage Vout is obtained when I1=0, and the characteristics of the direct-current component Voutb is represented by a line in which y-intercept $y_3$ is Vref−R2×I4 and slope $k_3$ is −I4.

The output voltage Vout corresponds to the detection voltage Vs, and the direct-current component Voutb of the output voltage Vout corresponds to the reference voltage Vb. That is, the detection voltage Vs and the reference voltage Vb linearly reduce as the resistance value R3 increases, whereas the threshold voltage Vt remains constant.

Hence, the magnitude of the voltage difference S expressed as {(R2+R3)/R1}×Vins linearly increases as the resistance value R3 increases. On the other hand, with the resistance value R3 being settable, if the threshold voltage Vt is set so as to become smaller than the reference voltage Vb=Vref−(R2+R3)×I4, the magnitude of the voltage difference B expressed as Vref−Vt−(R2+R3)×I4 linearly reduces as the resistance value R3 increases. Therefore, since the dividend of the margin ratio M defined as (S/B)×100 linearly increases and the divisor linearly reduces as the resistance value R3 increases, a characteristic line of the margin ratio M has a slope that increases as the resistance value R3 increases, in other words, the characteristic line is convex downward to the resistance value R3, showing monotonic increase.

Figure 9:
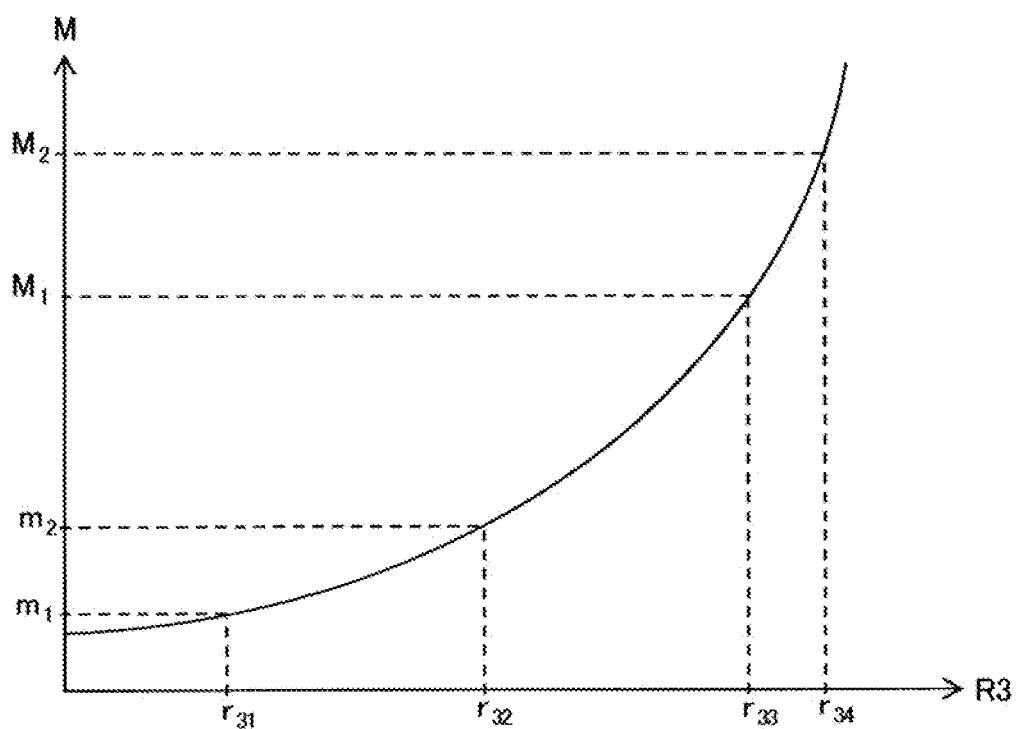
FIG. 9 is an explanatory view schematically showing an example of the operations of the photoelectric sensor 1 in FIG. 2, the view showing a characteristic line of a margin ratio M to the resistance value R3.

FIG. 9 is an explanatory view schematically showing an example of the operations of the photoelectric sensor 1 in FIG. 2. FIG. 9 shows a characteristic line of the margin ratio M to the resistance value R3. Due to the characteristics of the output voltage Vout shown in FIGS. 8A and 8B, the characteristic line of the margin ratio M to the resistance value R3 is convex downward, showing monotonic increase.

Considering that the reference value is 100, that is, the margin ratio M is the reference value of 100 when the detection voltage Vs coincides with the threshold voltage Vt, the margin ratio M in the photoelectric sensor 1 is adjusted so as to become 100+α when a detection target object is present and 100−α when a detection target object is absent. Such adjustment of the margin ratio M makes it possible to achieve appropriate detection operation of the photoelectric sensor 1. Therefore, regardless of the magnitude of the adjusted sensitivity, i.e., the magnitude of the resistance value R3, the variation seems more natural as the variation ratio of the margin ratio M to the rotation angle of the trimming operation section 12 is more constant, and the adjustment of the margin ratio M is more simplified.

As described above, the characteristic line of the margin ratio M has a slope that increases as the resistance value R3 increases, that is, is convex downward to the resistance value R3, showing monotonic increase. Hence, a variation ratio of the margin ratio M to a variation ($r_{31}$ to $r_{32}$) in the resistance value R3 for the rotation angle of the trimming operation section 12 when the resistance value R3 is small becomes closer to a variation ratio of the margin ratio M to a variation ($r_{33}$ to $r_{34}$) in the resistance value R3 for the rotation angle of the trimming operation section 12 when the resistance value R3 is large. The adjustment of the margin ratio M is thus simplified.

Specifically, when the characteristic line of the margin ratio M to the resistance value R3 is straight, there is a disadvantage that a variation in the margin ratio M with respect to the rotation angle of the trimming operation section 12 is fixed regardless of whether the value of the margin ratio M is large or small. This means that significantly changing the margin ratio M when the value of the margin ratio M is relatively large requires large increase in the rotation angle of the trimming operation section 12, resulting in increase in complexity of adjustment of the margin ratio M. Further, another disadvantage is that the accuracy of adjusting the margin ratio M is degraded due to a situation where fine-adjusting the margin ratio M when the value of the margin ratio M is relatively small requires reduction in the rotation angle of the trimming operation section 12.

In order to deal with the above disadvantages, the photoelectric sensor 1 according to this embodiment can simplify the adjustment of the margin ratio M. In particular, when the value of the margin ratio M is large, rotating the trimming operation section 12 by a small angle can significantly change the margin ratio M, which enables easy adjustment of the margin ratio M. On the other hand, when the value of the margin ratio M is small, rotating the trimming operation section 12 by a sufficient angle can fine-adjust the margin ratio M. Thus, the margin ratio M can be adjusted with high accuracy.

Figure 10:
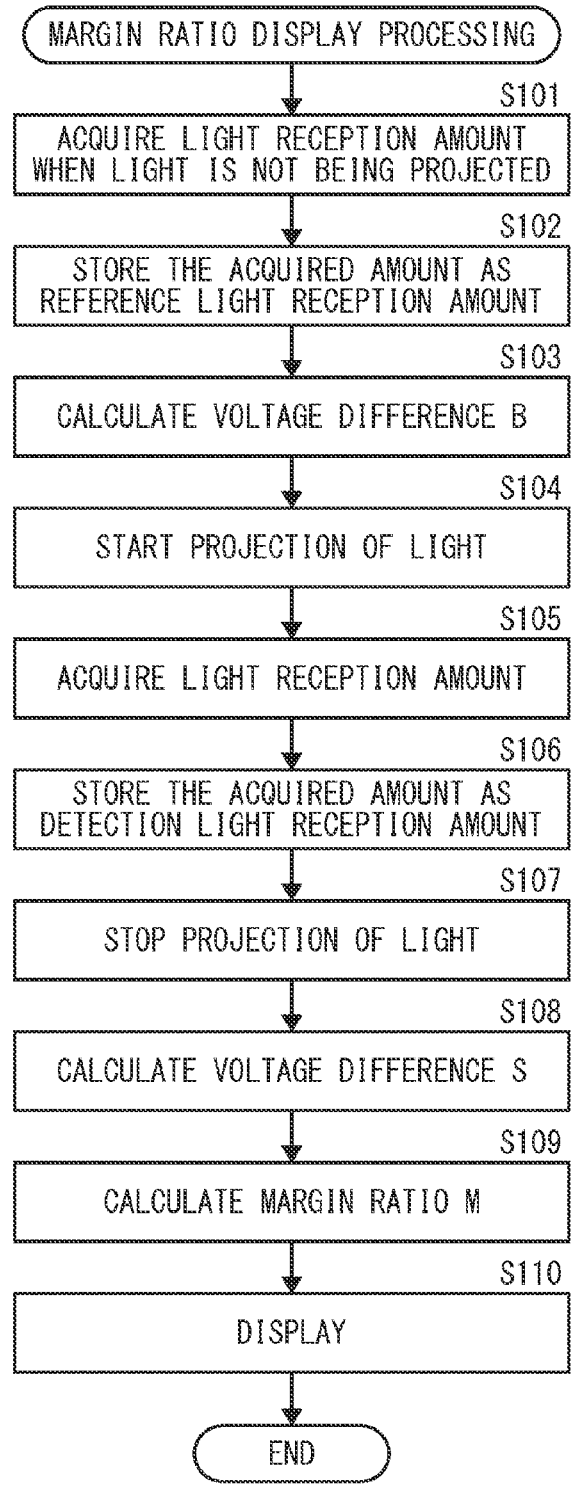
FIG. 10 is a flowchart showing an example of display processing of the margin ratio in the photoelectric sensor 1 in FIG. 2.

FIG. 10 is a flowchart describing an example of display processing of the margin ratio in the photoelectric sensor 1 in FIG. 2, using steps S101 to S110. First, the detection control section 22 acquires a light reception amount when the detection light L1 is not being projected and stores the acquired light reception amount as a reference light reception amount (steps S101 and S102). Further, the detection control section 22 calculates the voltage difference B from the reference light reception amount and the determination threshold value (step S103).

Next, when projection of the detection light L1 is started, the detection control section 22 acquires a light reception amount at a predetermined light reception timing between the start and the end of the projection and stores the acquired light reception amount as a detected light reception amount (steps S104 to S107). Subsequently, the detection control section 22 calculates the voltage difference S from the reference light reception amount and the detected light reception amount (step S108), calculates the margin ratio M from the ratio between the voltage differences S and B, and displays the margin ratio M in the display section 13, to finish the processing (steps S109 and S110). This display processing of the margin ratio M is repeated for each projection cycle TP.

According to this embodiment, the margin ratio M is displayed in the display section 13, and is adjusted by operating the trimming operation section 12 of the trimming resistor 51. This enables easy determination of whether or not the photoelectric sensor is in an operating state where the sensor can correctly determine the presence or absence of a detection target object, and enables adjustment of the margin ratio M according to the operating state. In particular, rotating the trimming operation section 12 allows intuitive sensitivity adjustment and ease grasp of the adjustment state. Moreover, a wide dynamic range can be ensured since the light receiving signal component of the determination light receiving signal is changed.

Further, the margin ratio M can be easily adjusted by changing the margin ratio M so that the characteristic line of the margin ratio M to the rotational position of the trimming operation section 12 becomes convex downward. For example, when the value of the margin ratio M is large, the margin ratio M can be significantly changed by rotating the trimming operation section 12 by a small angle, so that the margin ratio can be easily adjusted. On the other hand, when the value of the margin ratio M is small, the margin ratio M can be find-adjusted by rotating the trimming operation section 12 by a sufficient angle, so that the margin ratio can be adjusted with high accuracy.

Moreover, not only the voltage difference S but also the voltage difference B are changed by offsetting the determination light receiving signal. Thus, it is possible to make the characteristic line of the margin ratio M to the resistance value R3 convex downward with a simple configuration.

Second Embodiment

The first embodiment has been described as an example in which the present invention is applied to the photoelectric sensor 1 capable of adjusting the light reception sensitivity by operating the trimming operation section 12. On the other hand, the present embodiment will be described as an example in which the present invention is applied to the photoelectric sensor 1 capable of adjusting the emission intensity I of the light projecting section 3 by operating the trimming operation section 12.

Figure 11:
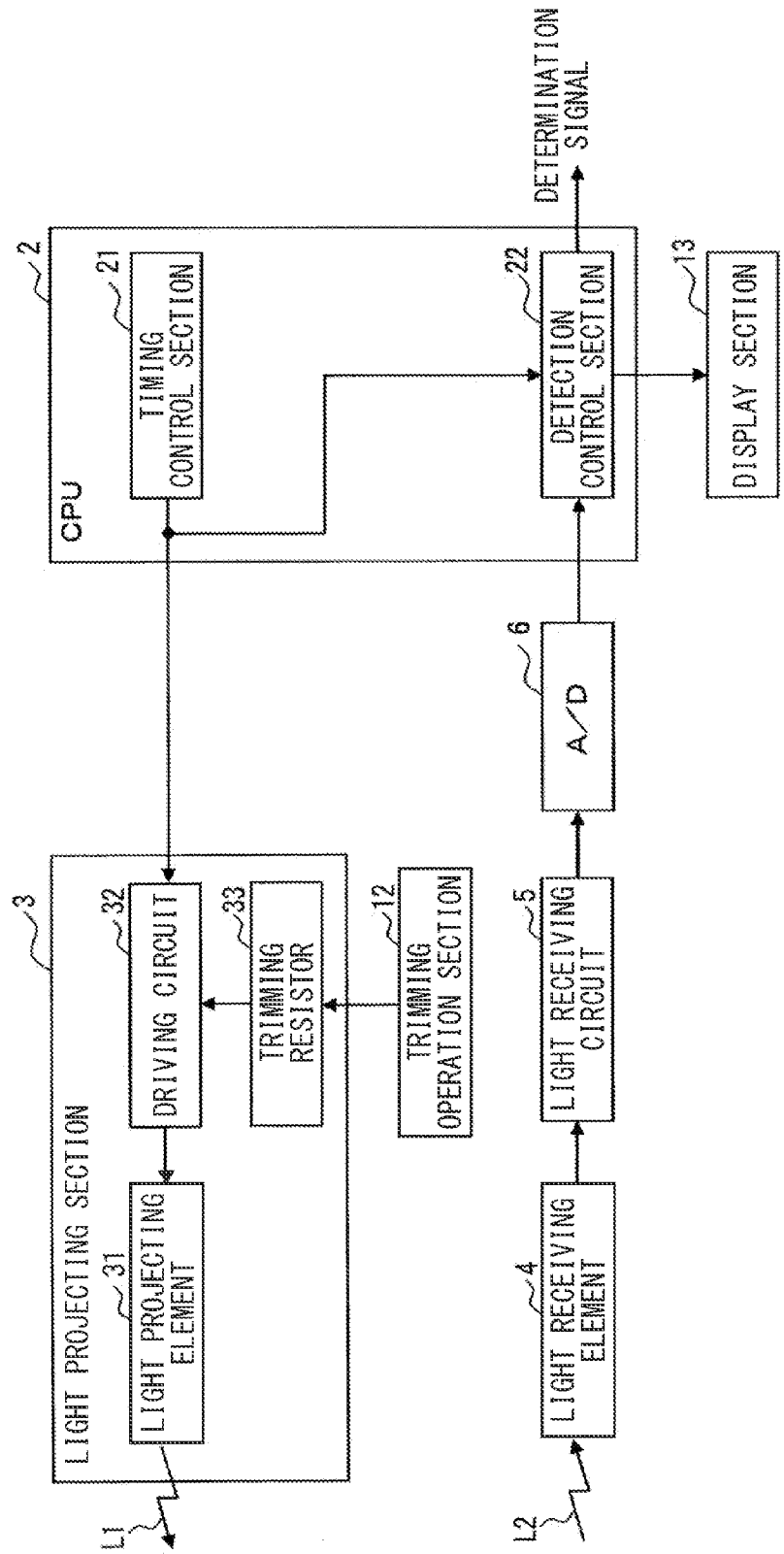
FIG. 11 is a block diagram showing an example of a configuration of a photoelectric sensor 1 according to a second embodiment of the present invention.

FIG. 11 is a block diagram showing an example of a configuration of the photoelectric sensor 1 according to the second embodiment of the present invention. The photoelectric sensor 1 is different from the photoelectric sensor 1 in FIG. 2 in that the light projecting section 3 includes a trimming resistor 33 having a resistance value R3 that changes according to the rotational position of the trimming operation section 12.

The driving circuit 32 is an emission amount adjusting section that changes an emission amount of the light projecting element 31 based on a resistance value R3 of the trimming resistor 33. The driving circuit 32 adjusts the signal strength for making the characteristic line of the margin ratio M to the resistance value R3 convex downward, by increasing the emission intensity I according to the resistance value R3.

Figure 12:
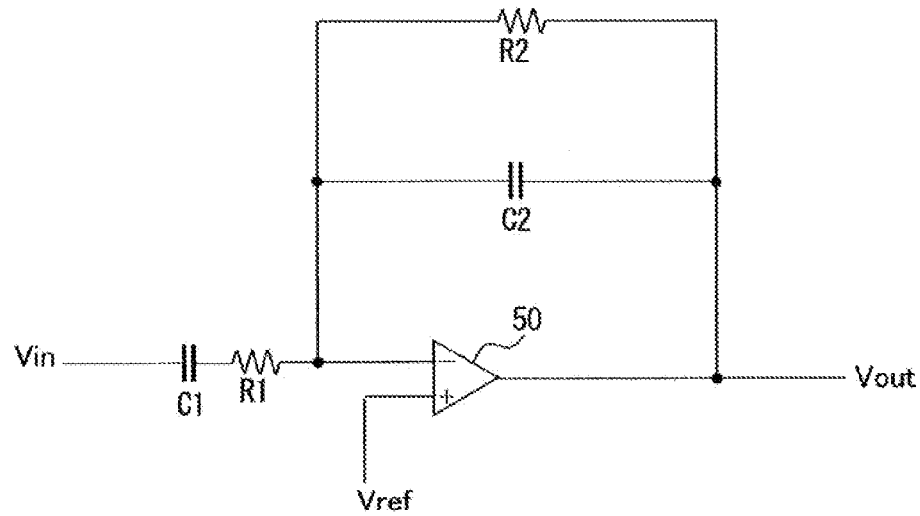
FIG. 12 shows an example of a configuration of a light receiving circuit 5 in FIG. 11.

FIG. 12 shows an example of a configuration of the light receiving circuit 5 in FIG. 11. The light receiving circuit 5 is different from the light receiving circuit 5 in FIG. 4 in that it does not include the trimming resistor 51 and the light reception amount offset section 52. The light receiving circuit 5 includes an inverting amplifier circuit having a fixed amplification factor. The fixed amplification factor is expressed as R2/R1.

Figure 13:
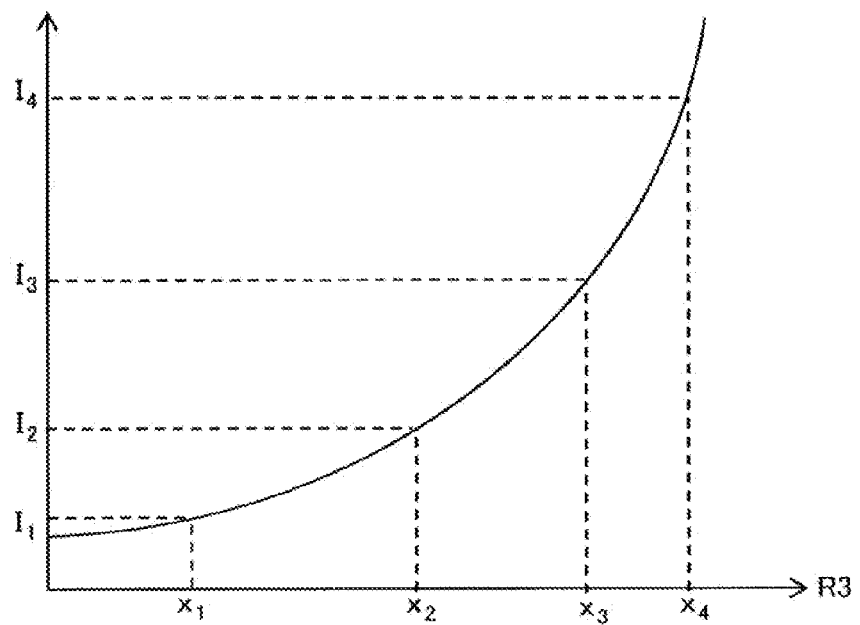
FIG. 13 is an explanatory view schematically showing an example of operations of the photoelectric sensor 1 in FIG. 11, the view showing a characteristic line of an emission intensity I to the resistance value R3 of a trimming resistor 33.

FIG. 13 is an explanatory view schematically showing an example of operations of the photoelectric sensor 1 in FIG. 11. In FIG. 13, the characteristic line of the emission intensity I to the resistance value R3 of the trimming resistor 33 is convex downward, showing monotonic increase.

Therefore, when the value of the margin ratio M is large, it is possible to significantly change the emission intensity I (from $I_3$ to $I_4$) to a variation (from $x_3$ to $x_4$) in the resistance value R3 for a small rotation angle of the trimming operation section 12.

On the other hand, when the margin ratio M is small, it is possible to fine-adjust the emission intensity I (from $I_1$ to $I_2$) by changing the resistance value R3 (from $x_1$ to $x_2$) for a sufficient rotation angle of the trimming operation section 12. This configuration also makes it possible to simplify the adjustment of the margin ratio M by changing the margin ratio M so that the characteristic line of the margin ratio M to the resistance value R3 of the trimming resistor 33 becomes convex downward.

Although the first and second embodiments relate to examples in which the characteristic line indicating the correspondence relation of the margin ratio M to the rotational position of the trimming operation section 12 is convex downward, the present invention does not limit the configuration of the signal strength adjusting unit to the above. For example, the present invention includes the signal strength adjusting unit configured such that the characteristic line indicating the correspondence relation of the margin ratio M to the rotational position of the trimming operation section 12 is an upward-sloping straight line.

Moreover, in the first embodiment, the signal strength adjusting unit changes the difference between the determination threshold value and the reference level by changing not only the light receiving signal component of the determination light receiving signal but also the reference level according to the rotational position of the trimming operation section 12. However, the present invention may have a configuration in which the difference between the determination threshold value and the reference level is changed by changing both the determination threshold value and the reference level, in addition to the light receiving signal component of the determination light receiving signal, according to the rotational position of the trimming operation section 12.

What is claimed is:

1. A photoelectric sensor comprising:
   a light projecting device configured to project a pulse of light from a light projecting element driven by a driving circuit;
   a light receiving element configured to receive the light projected from the light projecting device and to generate a light receiving signal according to an amount of the light received;
   a light receiving circuit configured to amplify the light receiving signal and to superimpose the light receiving signal on a reference level;
   an adjusting device having a variable resistor connected to a rotatable adjusting element and embedded in at least one of the driving circuit and the light receiving circuit, and configured to change a resistance value of the variable resistor according to a rotational position of the rotatable adjusting element so as to change the light receiving signal superimposed on a reference level by changing a characteristic of the at least one of the driving circuit and the light receiving circuit;
   an evaluator configured to generate a determination signal based on a comparison result between the light receiving signal superimposed on the reference level and a threshold value;
   a margin ratio calculator configured to calculate a ratio of an amount of the light receiving signal in the light receiving signal superimposed on the reference level and a difference between the threshold value and the reference level as a margin ratio; and
   a display device configured to display the margin ratio.

2. The photoelectric sensor according to claim 1, wherein the adjusting device is configured such that a characteristic line representing a correspondence relation of the margin ratio to the rotational position of the rotatable adjusting element is convex downward.

3. The photoelectric sensor according to claim 1, wherein the adjusting device changes a difference between the threshold value and the reference level by changing, according to the rotational position, at least one of the threshold value and the reference level in addition to an amount of the light receiving signal in the light receiving signal superimposed on the reference level.

4. The photoelectric sensor according to claim 1, further comprising a storage configured to store an amount of the light receiving signal superimposed on the reference level when the light is not projected from the projecting device as the reference level.

5. The photoelectric sensor according to claim 1, wherein the adjusting device is configured to change the resistance value of the variable resistor according to the rotational position of the rotatable adjusting element so as to offset the light receiving signal superimposed on the reference level by changing a characteristic of the at least one of the driving circuit and the light receiving circuit.

6. The photoelectric sensor according to claim 1, wherein the adjusting device is configured to change the resistance value of the variable resistor according to the rotational position of the rotatable adjusting element so as to offset the light receiving signal superimposed on the reference level by changing a characteristic of an inverting amplifier circuit couple to a constant current circuit in the light receiving circuit.

7. The photoelectric sensor according to claim 1, wherein the adjusting device is configured such that a characteristic line representing a correspondence relation of the margin ration to the rotational position of the rotatable adjusting element is convex downward, and configured to change the resistance value of the variable resistor according to the rotational position of the rotatable adjusting element so as to change the light receiving signal superimposed on the reference level by changing an amount of the light projected from the projecting device driven by the driving circuit.

8. The photoelectric sensor according to claim 1, further comprising a housing; and wherein the display device and the rotatable adjusting element disposed on the housing; and the light receiving circuit, the adjusting device, the evaluator and the margin ration calculator are installed in the housing.

* * * * *